United States Patent Office 3,846,215
Patented Nov. 5, 1974

3,846,215
THREE DIMENSIONAL REINFORCING COIL STRUCTURE AND METHOD OF FORMING SAME
Michel Antoine Jules Maistre, Bordeaux-Cauderan, France, assignor to Societe Europeenne de Propulsion, Puteaux, France
Filed Mar. 1, 1972, Ser. No. 230,900
Claims priority, application France, Mar. 5, 1971, 7107794
Int. Cl. B31c 31/00; B65h 54/00
U.S. Cl. 161—47                                  12 Claims

ABSTRACT OF THE DISCLOSURE

In or for a reinforced three-dimensional article, such as a compressor blade or a ground effect vehicle skirt, a reinforcing structure and a method of producing the same, in which a first set of layers of helical coils are wound in a first sense and a second set of layers of helical coils are wound in a first sense and a second set of layers of helical coils are wound in the opposite sense to said first set, the coils all having substantially the same diameter and pitch, the adjacent coils of each layer of a set being interthreaded with one another and the coils of adjacent layers of a set being interthreaded with one another, the axes of the coils of each set being parallel and lying on a network of polygonal mesh, the two meshes being identical, with the axes of the coils of one set being quincuncially arranged with respect to the axes of the coils of the other set and the coils of the second set being interthreaded with the coils of the two adjacent layers of the first set.

---

The present invention relates to a three-dimensional reinforcing structure and to a method of forming such a structure. This structure, embedded in a continuous coating product is intended to confer an increased resistance to delamination on the three-dimensional article thus produced.

Articles based on fibres with good mechanical characteristics are used in numerous techniques such as the manufacture of blades of compressors of turbo-machines or of skirts of ground-effect vehicles.

In order to manufacture such articles, a suitable number of parallel webs of filaments or of layers of woven fabric are usually superimposed in order to obtain the desired thickness. This reinforcement is embedded in a suitable impregnating material which can be, depending on the particular use, either a thermosetting resin or a thermoplastic resin. The thermosetting resin may be selected from phenolic, polyamide, polyester or epoxy resins and the thermoplastic resin may be any one of a number of elastomers as described at column 4 of U.S. Pat. No. 3,562,082.

As a result of this laminated arrangement of the reinforcement, the cohesion between the various parallel layers is only ensured in practice by the impregnating material, the mechanical characteristics of which are relatively poor. It follows that such composites are frequently prematurely destroyed in use as a result of the delamination between the various layers, causing the product to break up.

The aim of the present invention is to reduce the above-mentioned disadvantages.

According to the invention there is provided for a reinforced three-dimensional article, a reinforcing structure comprising a first set of layers of helical coils of filaments wound in a first sense and a second set of layers of helical coils of filaments wound in the opposite sense to said first set, the coils all having substantially the same diameter and pitch, the adjacent coils of each layer of a set being interthreaded with one another and the coils of adjacent layers of a set being interthreaded with one another, the axes of the coils of each set being parallel and lying on a network of polygonal mesh, the two meshes being identical, with the axes of the coils of one set being quincuncially arranged with respect to the axes of the coils of the other set and the coils of the second set being interthreaded with the coils of the two adjacent layers of the first set.

In the specification the term "interthreaded" is intended to indicate a situation in which each turn of a coil is looped through a corresponding turn of the coil with which it is interthreaded, to prevent lateral disengagement of the two coils with regard to one another.

According to another aspect of the invention, there is provided a method of forming a reinforcing structure for a reinforced three-dimensional article, said method comprising the steps of forming a plurality of first helical coils of a filament wound in a first sense, the coils all having substantially the same diameter and pitch; interthreading each coil with at least two adjacent coils, to form a first set of layers of coils, the adjacent coils of each layer being interthreaded and coils of adjacent layers being interthreaded, the axes of the coils of the first set of layers being parallel and lying in a network of polygonal mesh; of forming a plurality of second helical coils of a filament, the coils having substantially the same diameter and pitch as those of the first helical coils, but being wound in the opposite sense; interthreading each coil of the second set with coils of two adjacent layers of the first set and with at least two adjacent second helical coils to form a second set of layers of coils, the adjacent coils of each layer being interthreaded and coils of adjacent layers are interthreaded, the axes of the coils of the second set of layers being parallel to those of the first network and lying in a network of identical polygonal mesh to those of the first network, whereby the axes of the second network are quincunically arranged with respect to those of the first network.

The invention also extends to articles produced from the reinforcing structure.

When combined with an impregnating material in order to form a three-dimensional article, the structure of the invention leads to a product which is difficult to delaminate as a result of its three-dimensional interthreaded character. In effect, in contrast to laminated products, there is no possibility within this composite of producing a large surface detachment area without breaking a large number of filaments which are the resistant constituents of the article. It follows that, if rupture begins to occur, it is confined to a very small surface area and does not endanger the cohesion of the material.

Furthermore, depending on the geometric characteristics of the coils, the structure can be more compact or less compact and more or less deformable. Thus, in the case of an application in the manufacture of blades of compressors of turbo-machines, where a rigid composite with good mechanical properties which is capable of withstanding quite large deformations without breaking is sought, it is preferable to use a relatively compact structure of carbon filaments with good mechanical characteristics combined with a rigid impregnating material of the abovementioned type. On the other hand, in the case of an application in the manufacture of skirts for ground-effect vehicles, where it is desirable that the finished article shows great flexibility, it is preferable to use a structure which has a relatively low compactness made of filaments of a high strength material combined with a flexible impregnating material, such as an elastomer.

In order that the invention will become more fully understood, the following description is given, by way of example, reference being made to the accompanying drawings, in which.

Figure 1:
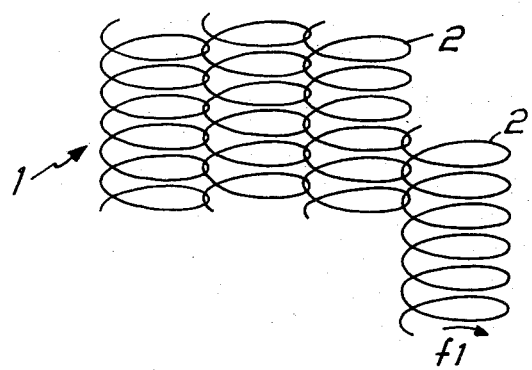
FIG. 1 is a view in perspective of one layer of filaments coiled in one and the same direction.
Figure 2:
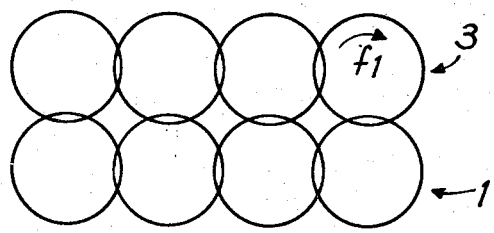
FIG. 2 is a plan view of the interthreading between two layers coiled in the same direction.

The method for the manufacture of the three-dimensional reinforcing structure consists of producing a layer 1 consisting of filaments 2 coiled in one sense, for example in the righthanded sense as indicated by the arrow $f_1$, and assembled among themselves in the manner shown in FIG. 1. The coils 2 have the same pitch and the same coil diameter, and the joining of these coils 2 is achieved for examle, by screwing one coil into the other. A second layer 3 of coils having the same righthanded pitch is attached to the first layer 1 in the same way as above, followed by a third layer and so on, the number of layers being determined by the dimensions of the structure (FIG. 2).

Figure 3:
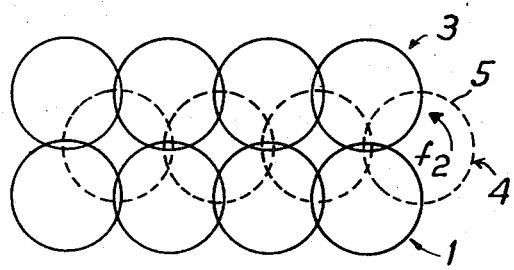
FIG. 3 is a plan view of two layers of filaments coiled in one direction and a layer of filaments coiled in the opposite direction interthreaded between them.

Between these layers 1 and 3, a layer of filaments 5, coiled in the opposite direction to the direction of layers 1 and 3, is interthreaded, the direction of the layer 4 being shown by the arrow $f_2$. The coils 5 have the same pitch and the same coil diameter as the coils 2 (FIG. 3). In the same way as before, another layer 6, identical to the ayer 4, is attached (FIG. 4).

Figure 4:
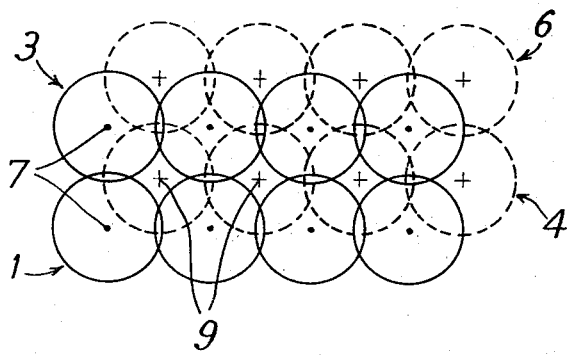
FIG. 4 is a plan view showing two layers of filaments coiled in one direction interthreaded with two layers of filaments coiled in the other direction.
Figure 5:
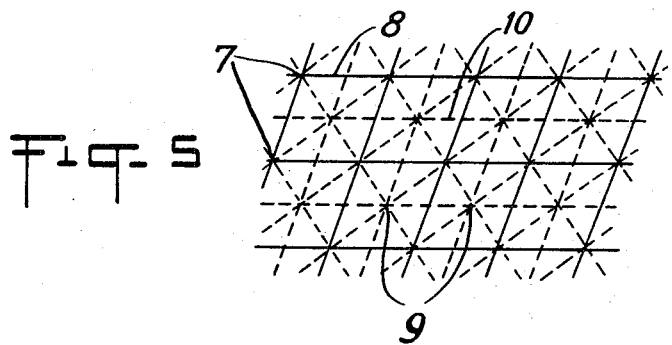
FIG. 5 is a schematic plan view of the different networks defined by the filaments coiled in the two directions.

As can be seen in FIGS. 4 and 5, the axes of all the coils are distinct, parallel to one another and located in a quincuncial arrangement. These axes are located in a network which comprises meshes which have the shape of a parallelogram which can be, for example, a square (FIG. 4). Thus, the axes 7 of the coils 2 coiled for example to the right, are located according to a network with diamond-shaped meshes 8, whilst the axes 9 of the filaments 5 coiled in the opposite direction to the previous ones, that is, to the left, are also located according to a network with diamond-shaped meshes 10, but which is displaced laterally relative to the previous network (FIG. 5). This method of joining shows that for a structure comprising, for example, three layers of filaments coiled to the right, the central filament is successively interthreaded with each of the four neighbouring filaments coiled in the same direction as itself; it goes without saying that the coils at the edges are interthreaded with only three coils coiled in the same direction as themselves.

Figure 6:
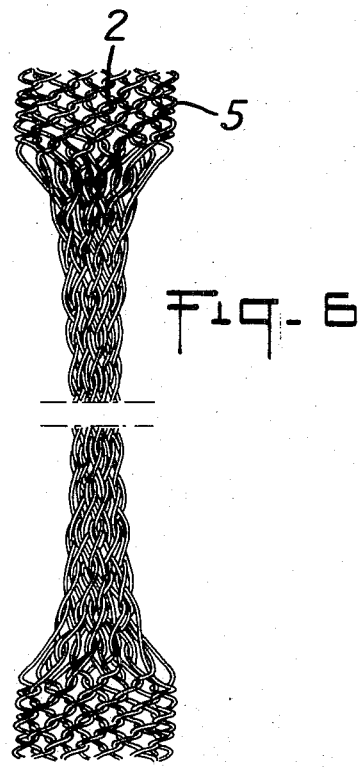
FIG. 6 is a view in perspective of a structure of which one part has been deformed.

The structure thus produced and shown schematically in FIG. 6 can be stretched in such a way as to modify the characteristics such as the compactness. To do this, it is sufficient to exert a tensile force along the axis of the coils simultaneously and to the same degree on all the coils.

In order to allow the coils to be screwed into position, they must be sufficiently rigid. If they are of a ductile material, for example iron wires, they are coiled in a manner analogous to the manufacture of springs. If they are of a very flexible material, for example if they consist of an assembly of a large number of natural or synthetic fibres, such as glass, carbon, polyester, nylon, wool or cotton fibres, or the like, they can be impregnated with a resinous material which can be stiffened, by shaping into coils by winding on a cylindrical mandrel and then stiffened in this state, for example, by drying or heating. In other cases, the stiffening can be produced by cooling depending on the nature of the resinous material.

Depending on the particular cases, the stretching, if it is necessary, can be carried out on the structure just as it has been produced by joining the rigid filaments, or after it has undergone a suitable treatment, for example, removal of the material used to stiffen the flexible filaments and/or impregnation with the material which will form the binding of the final product, and the like.

In order to produce a successful and uniform stretching, it is preferable to coat the ends of the assembly with a rigid material such as polyester resin or a similar product to form blocks. The extension force is thereafter applied via these blocks.

After stretching, the coated ends are cut off to leave only the stretched part which, depending on the relative dimensions of the coil such as the cross-sectional diameter, the coil diameter, the pitch of the coils and the dimensions of the meshes of the network, and depending on the characteristics of the filament or filaments used, such as metal, glass, natural or synthetic fibres, either mono-filament or multi-filaments, and the like, shows excellent properties with regard to its compactness, which reaches 72% of the total volume, such as its density, its cohesion and the like.

It should be noted that the product such as that represented in FIG. 6 can undergo large deformations along the direction of the axes of the coils. These longitudinal deformations cause transverse deformations in varying proportions and which differ from one position to another so that the compactness of the structure can vary greatly. This property can be used profitably in the manufacture of structures of controlled compactness.

Given that the structure comprises the same number of filaments coiled in each of the directions, the couples generated at the level of each filament under the effect of a longitudinal deformation of the assembly cancel one another out so that the structure reacts very well to mechanical influences; thus, such a structure does not show any tendency to kinking.

We claim:

1. A three-dimensional reinforcing structure comprising a plurality of superimposed layers of helical coils of filaments, the coils all having substantially the same diameter and pitch and parallel axes lying on a network of polygonal mesh, each coil of one coil layer being interthreaded with the adjacent coils of the same layer and with the adjacent coils of the adjacent layers.

2. A three-dimensional reinforcing structure comprising a plurality of superimposed layers of helical coils of filaments, wherein all the coils have substantially the same diameter and pitch and parallel axes lying on a network of polygonal mesh, wherein a first set of coil layers has coils wound in a first sense and a second set of layers has coils wound in the opposite sense to said first sense wherein each coil of one coil layer is interthreaded with the adjacent coils of the same layer and with the adjacent coils of the adjacent layers which coils have the same winding sense as said one coil layer, and wherein between two adjacent coil layers of said first layer set is disposed a coil layer of said second layer set, each coil of said layer of said second layer set being interthreaded with the adjacent coils of said two adjacent layers of said first layer set.

3. Structure as claimed in claim 2, wherein half the coils of the structure are in the first set and half in the second set.

4. Structure as claimed in claim 2, wherein the meshes of the networks are parallelogram shaped.

5. Structure as claimed in claim 4, wherein the meshes of the networks are square.

6. Structure as claimed in claim 2, wherein the filaments are yarns stiffened by a resinous material.

7. A method of forming a three-dimensional reinforcing structure, said method comprising steps of forming a plurality of helical coils of filament so as to have all the same winding sense and substantially the same diameter and pitch, and interthreading a coil with another and so on so as to form a first layer of interthreaded coils, forming a plurality of coil layers and interthreading each coil of one layer with a corresponding coil of an adjacent coil layer.

8. A method of forming a reinforcing three-dimensional structure, said method comprising the steps of forming a plurality of first helical coils of a filament wound in a first sense, the coils all having substantially the same diameter and pitch, interthreading each coil with at least two adjacent coils to form a first set of layers of coils, the coils of each layer being interthreaded with adjacent coils of the same layer and with adjacent coils of adjacent layers, the axes of the coils of the first set of layers being parallel and lying in a network of polygonal mesh, forming a plurality of second helical coils of a filament, the coils being substantially the same diameter and pitch as those of the first helical coils, but being wound in the opposite sense, interthreading each coil of the second set with coils of two adjacent layers of the first set and with at least two adjacent second helical coils to form a second set of layers of coils, the coils of each layer of said second being interthreaded with adjacent coils of the same layer and with adjacent coils of adjacent layers, the axes of coils of the second set of layers being parallel to those of the first network and lying in a network of identical polygonal mesh to that of the first network, whereby the axes of the second network are quincuncially arranged with respect to those of the first network.

9. The method as claimed in claim 8, wherein each of the filaments is in the form of a yarn stiffened by a resinous material.

10. The method as claimed in claim 8, comprising the further step of stretching all the layers simultaneously in a direction parallel to the axes of the coils to form a compact structure.

11. The method as claimed in claim 10, wherein the layers are stretched to an extent whereby the filaments occupy approximately 70% of the total volume of the structure.

12. The method as claimed in claim 8, comprising the further steps of impregnating the structure with a resinous material and setting the material.

References Cited
UNITED STATES PATENTS

| | | | |
|---|---|---|---|
| 3,531,349 | 9/1970 | Whipple | 156—173 |
| 3,403,844 | 10/1968 | Stoffer | 156—173 X |
| 3,713,753 | 1/1973 | Brunsch | 416—230 X |
| 3,449,199 | 6/1969 | Mead | 161—47 |
| 3,717,530 | 2/1973 | Case et al. | 161—47 X |
| 3,562,082 | 2/1971 | Van Buskirk | 161—47 |

PHILIP DIER, Primary Examiner

U.S. Cl. X.R.

156—144, 173, 195; 161—70; 416—230